(12) United States Patent
Lee (10) Patent No.: US 12,188,853 B2
(45) Date of Patent: Jan. 7, 2025

(54) DEVICE, SYSTEM, AND METHOD FOR RAPID FIXATION AND EMBEDDING OF BIOLOGICAL SPECIMENS

(71) Applicant: University of Cincinnati, Cincinnati, OH (US)

(72) Inventor: Paul Lee, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 779 days.

(21) Appl. No.: 17/417,187

(22) PCT Filed: Dec. 26, 2019

(86) PCT No.: PCT/US2019/068559
§ 371 (c)(1),
(2) Date: Jun. 22, 2021

(87) PCT Pub. No.: WO2020/139932
PCT Pub. Date: Jul. 2, 2020

(65) Prior Publication Data
US 2022/0074828 A1    Mar. 10, 2022

Related U.S. Application Data (60) Provisional application No. 62/784,959, filed on Dec. 26, 2018.

(51) Int. Cl.
*G01N 1/31* (2006.01)
*G01N 1/36* (2006.01)
(52) U.S. Cl.
CPC .................. *G01N 1/31* (2013.01); *G01N 1/36* (2013.01); *G01N 2001/366* (2013.01)

(58) Field of Classification Search
None
See application file for complete search history.

(56) References Cited

U.S. PATENT DOCUMENTS

| 5,817,032 A | 10/1998 | Williamson, IV et al. |
| 2010/0248215 A1 | 9/2010 | Halverson et al. |
| (Continued) | | |

FOREIGN PATENT DOCUMENTS

| WO | 2013059526 A1 | 4/2013 |

OTHER PUBLICATIONS

International Search Report in reference to co-pending International Patent Application No. PCT/US2019/068559 filed Dec. 26, 2019.
(Continued)

*Primary Examiner* — Jyoti Nagpaul
(74) *Attorney, Agent, or Firm* — Dinsmore & Shohl LLP (57) ABSTRACT

Provided herein is a device for rapid fixation and embedding of a biological specimen, the device including a barrel having a first end and a second end, the first end receiving a plunger and the second end opening to a compartment defining a block mold; and a plunger for inserting in the barrel, the plunger having a first end, a second end, and an interior conduit connecting the first and second ends, wherein the first end of the plunger connects to a vacuum source and the second end of the plunger includes a filter barrier between the interior conduit of the plunger and a receptacle for receiving, fixing, and embedding the specimen, the receptacle defined inside the barrel when the plunger is disposed in the barrel. Also provided are a system and method for rapid fixation and embedding of a biological specimen.

16 Claims, 5 Drawing Sheets

(56) References Cited

U.S. PATENT DOCUMENTS

| | | |
|---|---|---|
| 2010/0330660 A1 | 12/2010 | Hutchins et al. |
| 2012/0196344 A1* | 8/2012 | Li .......................... C12M 33/04 |
| | | 435/174 |
| 2012/0201726 A1 | 8/2012 | Pearcy et al. |
| 2018/0045745 A1* | 2/2018 | Holmes ................. B01L 3/0279 |

OTHER PUBLICATIONS

Written Opinion in reference to co-pending International Patent Application No. PCT/US2019/068559 filed Dec. 26, 2019.
Extended European Search Report dated Aug. 18, 2022 pertaining to EP application No. 19906541.8 filed Jul. 5, 2021, pp. 1-11.

* cited by examiner

DEVICE, SYSTEM, AND METHOD FOR RAPID FIXATION AND EMBEDDING OF BIOLOGICAL SPECIMENS

CROSS-REFERENCE TO RELATED APPLICATIONS

This application is a §371 national stage entry of International Application PCT/US2019/068559, filed Dec. 26, 2019, which claims priority to U.S. Provisional Application Ser. No. 62/784,959, filed Dec. 26, 2018, the entire disclosures of which are incorporated herein by reference.

BACKGROUND

Adequate and high quality cell and tissue blocks are essential for diagnosis and ancillary testing of biological specimens, such as cellular and tissue biopsies obtained from patients. Cell and tissue blocks serve alongside touch preps and smears as a source of representative tissue for morphologic diagnosis, immunohistochemical staining, and molecular testing. While current block preparation methods are suitable for use with most exfoliated cellular specimens, a need exists for improved systems and methods for more rapid processing of biological specimens that preserve the morphology and antigenicity of the specimen for further testing.

Currently, if a clinician requests that a biopsy be processed as a cell block on a rushed basis, the specimen is placed in a histology cassette and treated with buffered formalin before routine processing in a histopathology laboratory. Traditional methods of specimen processing require that an entire tissue processor be dedicated for fixing and embedding a single "rushed" sample. Even on a more rapid setting, the dedicated processor will require 3-5 hours of run time and will utilize the same amounts of solvents as would be required if the processor were loaded to capacity with a full batch of samples. Hence, current methods of expediting a particular sample result in extreme waste of reagents, when in actuality only a small volume of each reagent (e.g., fixative, alcohol, clearing reagent, and embedding reagent) is required per sample.

Further, with the advent of new methods of biopsy extraction, such as Covidien SharkCore™ (Medtronic, Minneapolis, Minn.) and other fine needle aspiration (FNA) systems, endoscopic methods are yielding specimens that are a hybrid of cytology and small biopsy specimens. Older cell block preparation methods are less adaptable to these newer types of biological specimens.

Improved technologies that facilitate rapid, high-quality processing of individual biological specimens and accommodate the emerging types of specimens generated by clinicians are needed for cell and tissue block preparation.

SUMMARY

Accordingly, provided herein are a device, system, and method for rapid fixation and embedding of a biological specimen, which preserve the antigenicity and morphology of the specimen while permitting more rapid, individual processing as a block preparation.

In one embodiment, a device for rapid fixation and embedding of a biological specimen in an embedding matrix is provided, the device comprising: a barrel comprising a first end and a second end, the first end of the barrel receiving a plunger, and the second end of the barrel opening to a compartment defining a block mold; and a plunger for inserting into the barrel, the plunger comprising a first end, a second end, and an interior conduit connecting the first end and the second end, wherein: the first end of the plunger connects to a vacuum source; and the second end of the plunger comprises a filter, the filter providing a semi-permeable barrier between the interior conduit of the plunger and a receptacle for receiving and processing the biological specimen, said receptacle defined inside the barrel when the plunger is disposed in the barrel.

In another embodiment, a system for rapid fixation and embedding of a biological specimen in an embedding matrix is provided, the system comprising: a vacuum source; a device comprising: a barrel comprising a first end and a second end, the first end of the barrel receiving a plunger, and the second end of the barrel opening to a compartment defining a block mold; a plunger for inserting into the barrel, the plunger comprising a first end, a second end, and an interior conduit connecting the first end and the second end, wherein: the first end of the plunger is operably connected to the vacuum source; and the second end of the plunger comprises a filter, the filter providing a semi-permeable barrier between the interior conduit of the plunger and a receptacle for receiving and processing the biological specimen, said receptacle defined inside the barrel when the plunger is inserted in the barrel; and a heat source in thermal connection the device. In embodiments, the system further comprises a cooling source in thermal communication with the compartment defining the block mold and an insulating layer disposed between the heat source and the cooling source.

In another embodiment, a method for rapid fixation and embedding of a biological specimen is provided, the method comprising: providing a system as disclosed herein, wherein the plunger is inserted into the barrel to define the receptacle for receiving and processing the biological specimen; orienting the biological specimen in the receptacle; fixing the biological specimen, said fixing comprising: adding a fixative to the receptacle and heating the receptacle; incubating the specimen for a predetermined period of time; and activating the vacuum source to evacuate the fixative from the receptacle through the filter; dehydrating the biological specimen, said dehydrating comprising: adding alcohol to the receptacle and heating the receptacle; incubating the specimen for a predetermined period of time; and activating the vacuum source to evacuate the alcohol through from the receptacle through the filter; clearing the alcohol from the biological specimen, said clearing comprising: applying a clearing solvent to the receptacle and heating the receptacle; incubating the specimen for a predetermined period of time; and activating the vacuum source to evacuate the clearing solvent from the receptacle through the membrane; embedding the specimen, said embedding comprising: adding molten embedding matrix to the receptacle; actuating the plunger so that a top surface of the filter is brought horizontally in plane with a bottom surface of the compartment defining the block mold; and cooling the embedding matrix to provide a fixed and embedded biological specimen.

These and other embodiments and aspects will be clarified and better understood by reference to the figures and detail description set forth below. Figures are provided to illustrate technical problems in the art as well as specific embodiments and aspects of the invention and should not be construed as limiting the full scope of the claims appended hereto.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided herein.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, pH, size, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Provided herein are a device, system, and method for rapid fixation and embedding of a biological specimen, each of which preserves the antigenicity and morphology of the specimen while permitting more rapid, individual processing of the specimen for use in a prepared cell or tissue block. The disclosed device, system, and methods provide highly cellular, reproducible, rapid block preparations that maximize solvent/cellular interaction and collection rate while creating a uniform block for histological analysis.

In embodiments, the biological specimen is a tissue biopsy or a cellular specimen obtained from a patient. In a specific embodiment, the biological specimen is a fine needle biopsy (FNB) specimen or fine needle aspiration (FNA) specimen obtained from a patient.

Reference is made to the accompanying figures, wherein like numbers are employed to designate like parts.

Figure 1A:
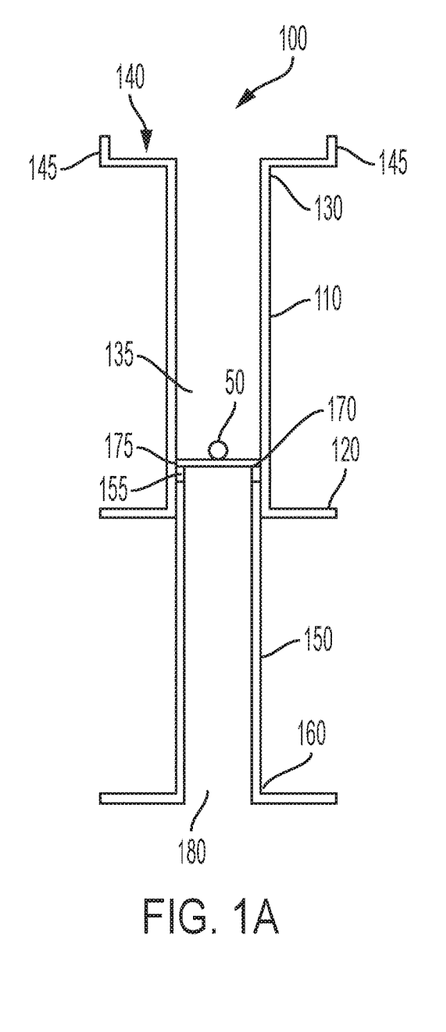
FIG. 1A is a cross-sectional view of an embodiment of a device as disclosed herein.
Figure 1B:
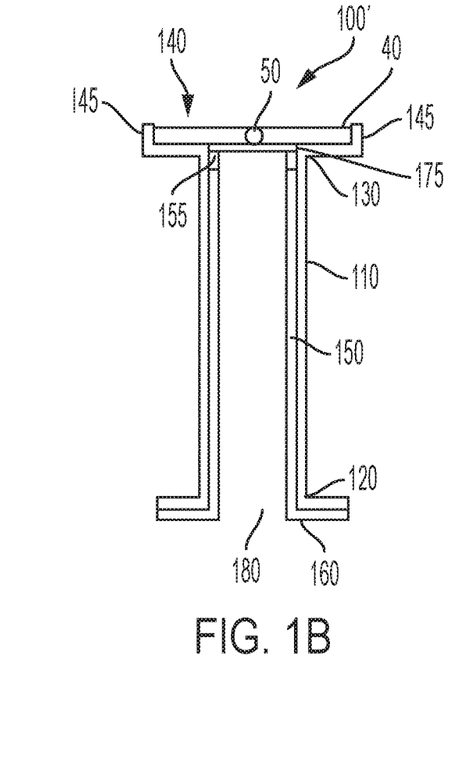
FIG. 1B is a cross-sectional view of an embodiment of a device as disclosed herein.

Referring to FIGS. 1A and 1B, cross-sectional views of a device 100, 100' for rapid fixation and embedding of a biological specimen are provided. The device 100, 100' includes a barrel 110 having a first end 120 and a second end 130. The first end of the barrel 120 receives a plunger 150. The second end of the barrel 130 opens to a walled compartment 145 defining a block mold 140. The walled compartment 145 may flare out perpendicularly from the barrel 110, such that the length and/or width of the compartment are greater than the length and/or width of the barrel 110, as shown in FIGS. 1A, 1B. In embodiments, the compartment and the barrel share the same length and width dimensions, such that the compartment has the same dimensional footprint as the barrel (not shown). In embodiments, the device further comprises a platform extending perpendicularly from the top edges of the walled compartment 145 (not shown). In another embodiment, the device further comprises a platform extending perpendicularly from the bottom edge of the walled compartment. In embodiments, the first end 120 of the barrel 110 comprises a flanged end for ease of manipulation. FIG. 1A shows the plunger 150 inserted into the barrel 110 to define the receptacle 135. FIG. 1B shows the plunger 150 actuated upward to bring the filter 175 horizontally in plane with a bottom surface of the compartment 145 to facilitate creation of a cell or tissue block within the block mold 140.

In embodiments, the block mold 140 is a mold for making an embedded tissue block or an embedded cell block preparation of a biological specimen.

Plunger 150 has a first end 160 that connects to a vacuum source (not shown), a second end 170 for insertion into the first end 120 of the barrel, and an interior conduit 180 connecting the first and second ends 160, 170 of the plunger 150. Thus, in embodiments the plunger 150 is a hollow member configured such that solvents added to the device receptacle to process the biological specimen can be evacuated through the interior conduit of the plunger and removed from the receptacle and biological specimen.

The second end of the plunger 170 comprises a seal 155 for maintaining a substantially fluid-tight seal around an interior perimeter of the barrel 110. A filter 175 is disposed on the second end of the plunger 170, forming a semi-permeable barrier between the interior conduit 180 of the plunger 150 and a receptacle 135. The receptacle 135 is defined by the interior of the barrel 110 and the top surface of the filter 175 when the plunger 150 is disposed inside the barrel 110. The receptacle 135 receives a biological specimen 50, as well as solvents and reagents used in processing the biological specimen. The filter 175 permits flow of solvents from the receptacle 135 to the interior conduit 180 of the plunger 150, for evacuation from the device.

In embodiments, the filter 175 is a semi-permeable filter that permits flow of solvents through the filter, while forming a barrier that prohibits cells and/or tissue of the biological specimen 50 from passing into the interior conduit 180. In specific embodiments, the filter 175 is comprised of a material selected from the group consisting of polycarbonate, cellulose nitrate, cellulose acetate, polyethersulfone, polytetra-fluoroethylene, polyamide, porous silicone, porous rubber, and combinations thereof. In a specific embodiment, the filter is a semi-permeable membrane or a porous silicone or porous rubber filter.

In embodiments, a separate seal 155 is omitted and the filter 175 is composed of a material that has both sealing and filtering properties. For example, in embodiments, the filter 175 is composed of a perforated or porous material that selectively permits flow of liquid solvents through the filter, while preventing passage of a biological specimen 50, such as a tissue biopsy, through the perforations. In such embodiments, the filter 175 is a silicone or rubber filter, having pores or perforations traversing the thickness thereof to permit passage of solvents, while prohibiting passage of the biological specimen. Such an embodiment is particularly suitable for use with solid tissue biopsies.

The barrel 110 and plunger 150 may be made of any material suitable for manipulating the specimens and solvents used in cell or tissue block preparation, so long as the materials are durable to withstand the heating and cooling steps described herein. In embodiments, the barrel and plunger are independently composed of materials selected from the group consisting of plastic or plastic composites.

In embodiments, a gel matrix (not shown) is optionally disposed on a top surface of the filter 175. The gel matrix facilitates orientation of the biological specimen 50 within the receptacle 135 prior to processing and minimizes undesired movement of the biological specimen during rapid fixation and embedding steps.

In embodiments, the barrel 110 of the device 100, 100' has a cross-sectional shape across its diameter that is substantially square, substantially rectangular, or substantially circular. The cross-sectional shape of the plunger 150 and/or barrel 110 may be different from each other, so long as a fluid-tight seal is formed between the second end of the plunger 170 and the interior surface of the barrel 110 when the plunger is disposed inside the barrel of the device.

The plunger 150 can be actuated up and down within the interior of the barrel 150 upon application of pressure, in the same manner that a plunger functions in a conventional syringe barrel. In embodiments, the plunger 150 is actuated up and down to thoroughly distribute cells within a matrix or solvent and ensure that portions of the specimen are not adhered to an inside wall of the barrel 110, during any of the process steps described herein below.

In embodiments, the plunger 150 is disposed inside the barrel 110 of the device 100, defining a receptacle 135 for receiving the biological specimen 50. The biological specimen 50 is oriented in the receptacle 135 on a top surface of the filter 175 for further processing, optionally with the assistance of a gel matrix disposed on a top surface of the filter 175 to hold the specimen substantially in place.

In embodiments, the gel matrix is comprised of a material that dissolves when contacted with solvents or reagents used in fixation, dehydration, and/or clearing of the reagents during the block preparation steps. In another embodiment, the gel matrix remains intact throughout block preparation.

In embodiments, the gel matrix is matrix is selected from the group consisting of agar gel, thrombin, plasmin, and combinations thereof.

Figures 2A, 2B:
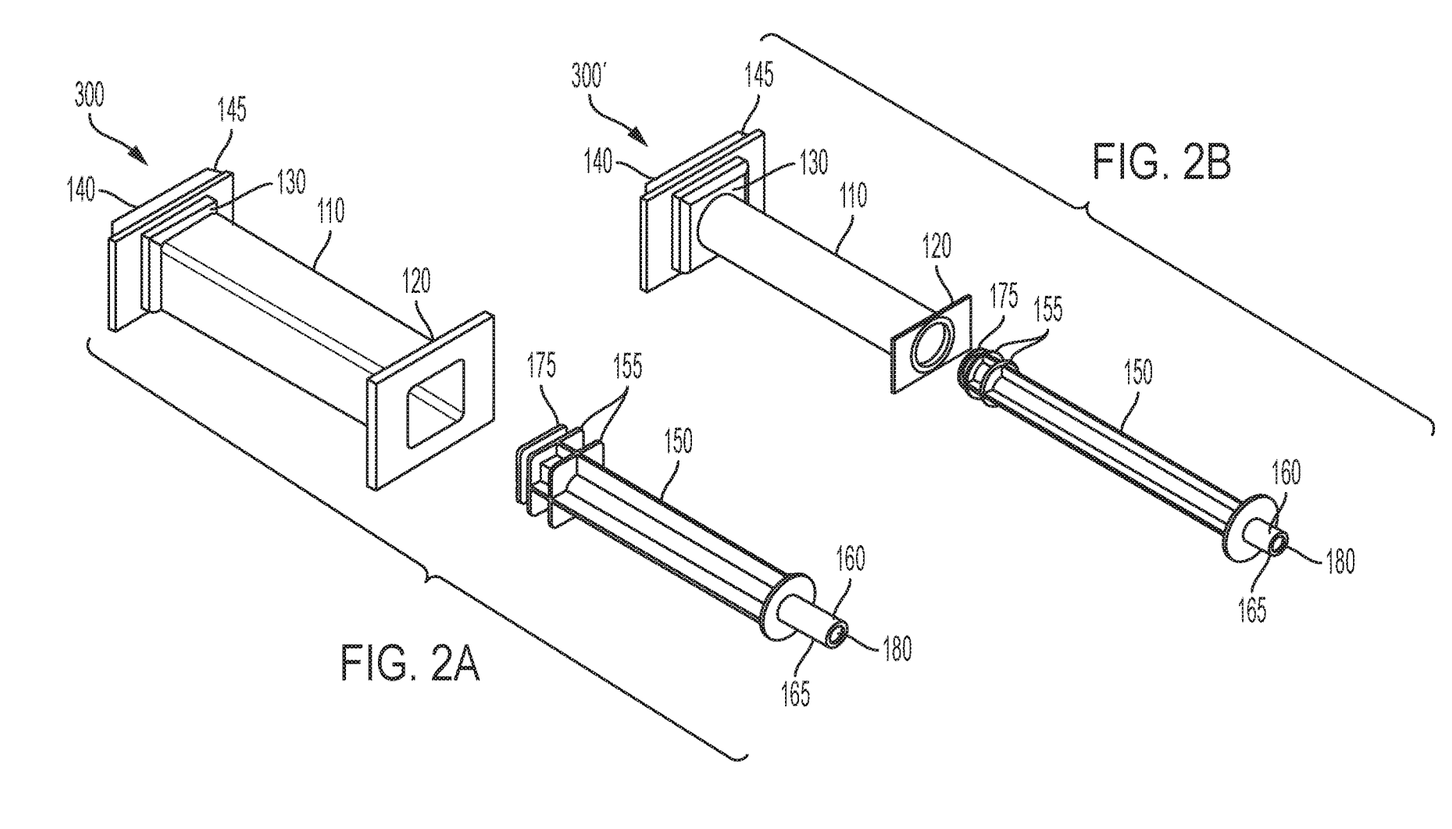
FIG. 2A is a perspective view of an embodiment of a device as disclosed herein.
FIG. 2B is a perspective view of an embodiment of a device as disclosed herein.

FIG. 2A is a schematic representation of a device 300. In the illustrated embodiment, the barrel 110 has a substantially square cross-sectional shape across the diameter. While the plunger 150 is substantially cylindrical, the seals 155 are substantially square-shaped and configured to form a seal within the interior of the barrel 110 when the plunger 150 is disposed inside the barrel. The first end 160 of the plunger further comprises an outlet 165 for connecting the plunger to a vacuum source, for example, by connective tubing.

FIG. 2B is a schematic representation of a device 300'. In the illustrated embodiment, the barrel 110 has a substantially circular cross-sectional shape across the diameter. The plunger 150 is substantially cylindrical and configured such that the seals 155 form a seal within the interior of the barrel 110 when the plunger 150 is disposed inside the barrel. The first end 160 of the plunger 150 further comprises an outlet 165 for connecting the plunger to a vacuum source, for example, by connective tubing.

Figure 3A:
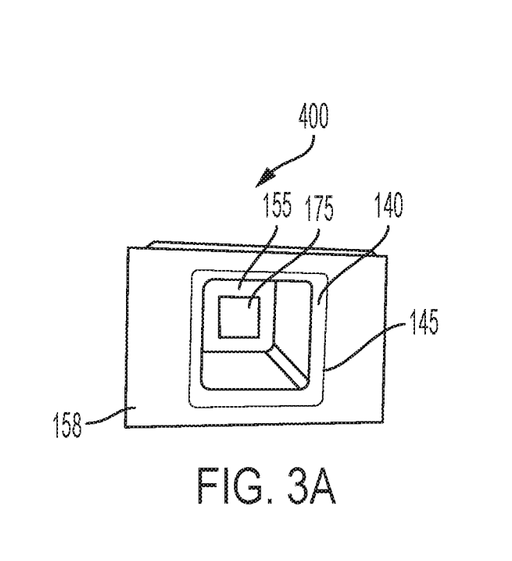
FIG. 3A is a top view of a device as disclosed herein.
Figure 3B:
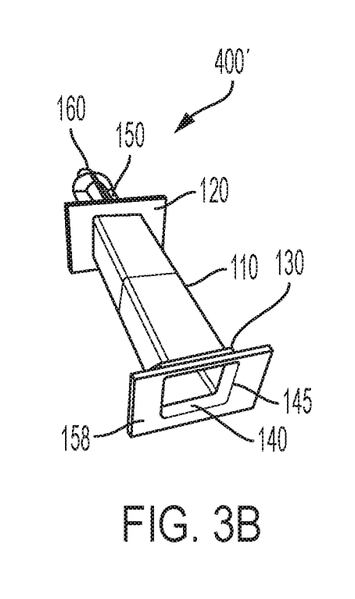
FIG. 3B is a perspective view of a device as disclosed herein.
Figure 3C:
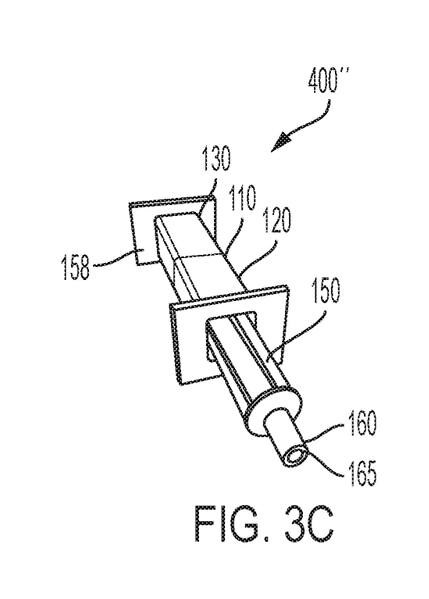
FIG. 3C is a perspective view of a device as disclosed herein.

FIG. 3A provides a top view of an exemplary device 400 according to the present disclosure, wherein the compartment 145 defining the block mold 140 are visible. A platform 158 extends perpendicularly from the top edges of the compartment 145. The platform 158 is suitable for receiving a histology cassette (not shown). FIGS. 3B and 3C provide further perspective views of an exemplary device 400', 400" according to the present disclosure.

Also provided is a system for rapid fixation and embedding of a biological specimen in an embedding matrix. Such a system comprises a device for rapid fixation and embedding of a biological specimen in an embedding matrix as described herein, a vacuum source operably connected to the first end of the plunger 150, and a heat source in thermal connection with the device, barrel, and/or receptacle.

Figure 5:
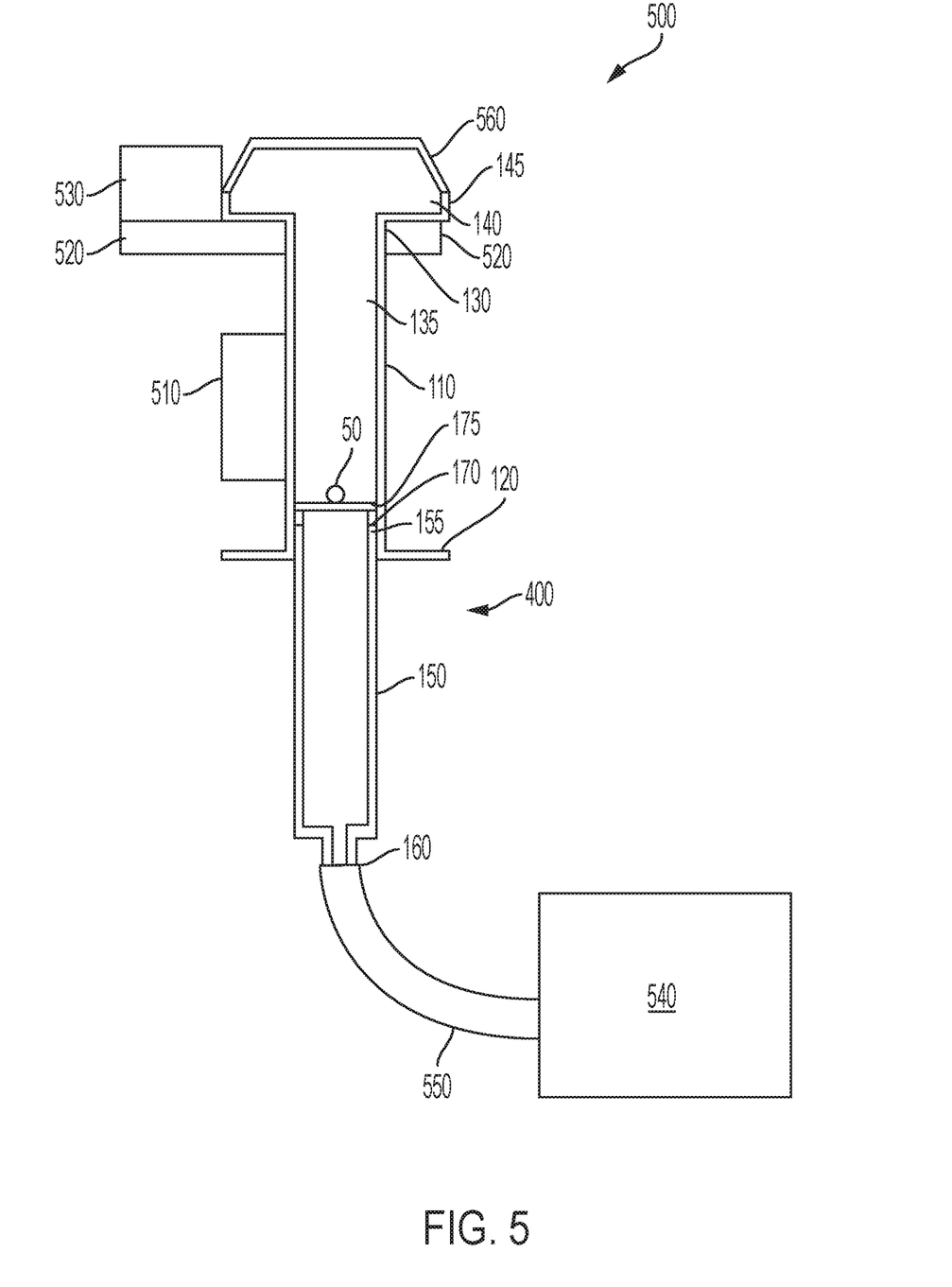
FIG. 5 is a cross-sectional view of a system as disclosed herein.

FIG. 5 shows a cross-sectional view of an exemplary system 500. A device 400 as described herein is coupled to a vacuum source 540, such as a vacuum pump, by way of connecting tubing 550 attached to the first end 160 of the plunger. The barrel 110 housing the receptacle 135 is in thermal communication with a heat source 510, for heating the reagents used in the fixation, dehydration, clearing, and embedding steps as desired. A histology cassette 560 is disposed on top of the device 400. A cooling source 530 is optionally in thermal communication with the compartment 145, block mold 140, and/or cassette 560 in order to cool and solidify melted embedding matrix. Optionally, an insulating layer 520 is disposed between the heat source 510 and the cooling source 530.

Suitable insulating layers 520 are well known in the art. In embodiments, the insulating layer is comprised of polystyrene or polyisocyanurate foam.

Suitable vacuum sources 540 are well known in the art. In embodiments, the vacuum source is a vacuum trap configured to receive the liquids evacuated from the receptacle of the device upon activation of the vacuum. In embodiments, the vacuum source is a vacuum pump.

The ordinary skilled artisan will appreciated that various heat sources 510 known in the art are suitable for use in the system and methods described herein. In embodiments, the heat source is selected from the group consisting of a heating element, a thermal cycler, a heat sink, a microwave producing magnetron, and combinations thereof.

Various cooling sources 530 are also suitable for use in the disclosed systems. In embodiments, the cooling source is a recirculating cooler.

Methods of Use

To begin the rapid fixation and embedding process, the biological specimen 50 is oriented in the receptacle 135. As described above, optionally a gel matrix is disposed on a top surface of the filter 175 to minimize movement of the biological sample in during the later processing steps.

In certain embodiments, it is advantageous to achieve even distribution of the biological specimen within the gel matrix prior to fixation. For example, if the biological specimen is primarily cellular in nature, it may be desirable to achieve an even distribution of the cells within the gel matrix prior to fixation. With conventional cell block preparation methods, it is not uncommon for cellular specimens to "sink" to the bottom of the preparation, such that cellular density is greater on the bottom surface of the cell block, with upper layers of the cell block having substantially fewer cells. Because of this uneven distribution of cells, only a few sections of the cell block will actually contain a significant number of cells for staining or analysis. This problem of the conventional methods is addressed by the presently disclosed methods.

Even distribution of cells permits division of the later-produced cell block into many functional sections, each having a substantially similar distribution of cells. Even distribution of cells within the gel matrix may be accomplished by stirring the specimen in the gel matrix, sonicating, and/or oscillating the plunger axially to distribute cells evenly within the gel matrix, prior to fixation.

Once the biological specimen is oriented, a fixative is added to the receptacle 135. Optionally, the plunger 150 may be actuated up and down as needed within the barrel 110 to facilitate even distribution of the fixative in the receptacle 135. The device and/or receptacle is then heated to a desired fixing temperature and incubated for a predetermined period of time, to permit the fixative to fully penetrate the biological specimen. Optionally, pressure may be applied to the system to further facilitate the fixation process. In embodiments, the device and/or receptacle is heated to from about 30° C. to about 70° C. In a specific embodiment, the device and/or receptacle is heated to about 40° C. to facilitate fixation. Incubation with the fixative may require from about 2 minutes to about 10 minutes, which may be the predetermined time, although the practitioner will appreciate that this time may be adapted to the preparation at hand. A vacuum is then applied to the first end of the plunger to evacuate the fixative from the receptacle and through the filter. In some embodiments, the fixation step may be repeated more than once, as desired by the practitioner. For example, in certain embodiments, a cycle of (1) adding fixative, (2) heating, (3) incubating, and (4) evacuating the fixative is carried out once, twice, three times, four times, five times, six times, seven times, eight times, nine times, ten times, or more. In certain embodiments, the cycle is repeated from one to three times.

Various fixatives are known in the art and suitable for use in the disclosed methods of biological specimen fixation. In embodiments, the fixative is selected from the group consisting of buffered formalin, acetone, and combinations thereof. In a specific embodiment, the fixative comprises 10% buffered formalin mixed with about 0-5% acetone.

After the fixative is evacuated from the receptacle, alcohol is added to the receptacle to dehydrate the biological specimen. In a specific embodiment, the alcohol is ethanol. Optionally, the plunger 150 may be actuated up and down within the barrel 110 to facilitate even distribution of the alcohol in the receptacle 135. The device and/or receptacle is then heated to a dehydrating temperature and incubated for a predetermined period of time, to permit dehydration of the biological specimen. In embodiments, the device and/or receptacle is heated to from about 30° C. to about 70° C. In a specific embodiment, the device and/or receptacle is heated to about 40° C. to facilitate dehydration. Incubation with the alcohol may require from about 2 minutes to about 10 minutes, which may be the predetermined time, although the practitioner will appreciate that this time may be customized to the preparation at hand. The vacuum is then applied to the first end of the plunger to evacuate the alcohol from the receptacle, through the filter. In some embodiments, the dehydration step may be repeated more than once, as desired by the practitioner. For example, in certain embodiments, a cycle of (1) adding alcohol, (2) heating, (3) incubating, and (4) evacuating the alcohol is carried out once, twice, three times, four times, five times, six times, seven times, eight times, nine times, ten times, or more. In certain embodiments, the cycle is repeated from one to three times.

A clearing step is then carried out to remove residual alcohol from the biological specimen. In a specific embodiment, the clearing solvent is xylene. The clearing solvent is added to the receptacle. Optionally, the plunger 150 may be actuated up and down within the barrel 110 to facilitate even distribution of the clearing solvent in the receptacle 135. The device and/or receptacle is heated to a clearing temperature and incubated for a predetermined period of time, to facilitate clearance of the alcohol from the biological specimen. In embodiments, the device and/or receptacle is heated to from about 30° C. to about 90° C. to facilitate clearing. In a specific embodiment, the device and/or receptacle is heated to about 40° C. to facilitate clearing. Incubation with the clearing solvent may require about 2 minutes to about 10 minutes, although the practitioner will appreciate that this time may be customized to the preparation at hand. The vacuum is then applied to the first end of the plunger to evacuate the clearing solvent from the receptacle, through the filter. For example, in certain embodiments, a cycle of (1) adding clearing solvent, (2) heating, (3) incubating, and (4) evacuating the solvent is carried out once, twice, three times, four times, five times, six times, seven times, eight times, nine times, ten times, or more. In certain embodiments, the cycle is repeated from one to three times.

Once the specimen has been fixed, dehydrated, and cleared and all solvents have been evacuated from the receptacle, the specimen is embedded in the embedding matrix. In embodiments, the embedding matrix is selected from the group consisting of paraffin wax, carbowax, acrylic resin, epoxy resin, agar, gelatin, and combinations thereof. In a specific embodiment, the embedding matrix is paraffin wax.

Figure 1C:
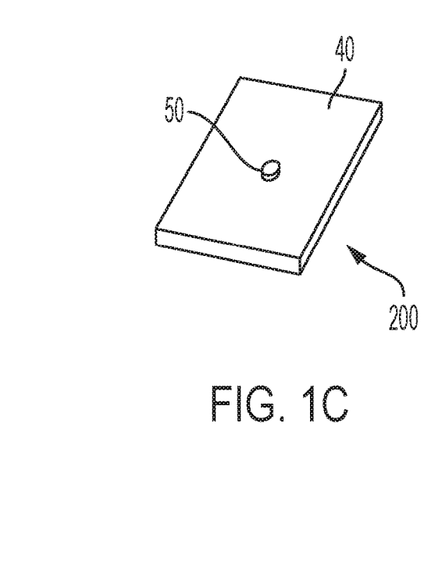
FIG. 1C is a perspective view of a cell block comprising an embedded biological specimen.

Molten embedding matrix is added to the receptacle 135 and the plunger 150 is actuated upward by applying pressure, to bring the top surface of the filter 175 horizontally in plane with the bottom surface of the compartment 145 defining the block mold 140. Additional embedding matrix may be added, if necessary, to fill the block mold to a desired level. A histology cassette is optionally affixed to the top of the compartment 145, and additional embedding matrix may be added to attach the histology cassette to the processed block. Optionally, the device and/or receptacle may be heated during this step to maintain the embedding matrix in a molten state. The device is cooled to provide a solid cell or tissue block 200 comprising the embedded biological specimen 50, which is removed from the block mold 140 (see FIG. 1C).

The compartment housing the cell or tissue block is cooled by a cooling source in thermal connection with at least the compartment defining the block mold. Various cooling sources are known in the art and suitable for use in the instant system and methods. In embodiments, the cooling source is a recirculating cooler. In embodiments, the block mold is cooled to between about −10° C. and about 20° C. in order to solidify the block for further analysis.

The cell or tissue block is then ready for sectioning by microtome and further analysis by conventional immunohistochemical analyses.

In embodiments, the methods described herein are automated. In embodiments, the methods are carried out by a programmable, automated system having a memory and a processor programmed to control method step settings, such as plunger position, addition of solvents, heating, cooling, and vacuum application. The system optionally comprises a display for interfacing with the system.

In embodiments, the disclosed rapid methods for fixation and embedding of a biological sample is completed in less than about 4 hours. In a more specific embodiment, the method is completed in less than about 3 hours. The rapid methods disclosed herein advantageously permit the clinician to obtain test results for a patient, such as a patient recovering from biopsy in a same-day surgery center, within the window of time when the patient is still on-site at the medical facility.

Further, the presently disclosed methods avoid the wasteful use of excess reagents currently required to expedite processing of a sample of interest. The instant methods can be carried out without the use of a dedicated processor. Further, multiple samples can be processed simultaneously or on an overlapping time schedule without waiting for availability of a dedicated processor. Moreover, the presently disclosed device, system, and methods mitigate cross-contamination, as the device facilitates self-contained processing of a sample, from fixation through embedding. The device and/or component parts can be manufactured for single use, which may also mitigate cross-contamination. The instantly disclosed device, system, and method allows the clinician to more quickly obtain high quality cell or tissue block preparations of biological specimens, in order to improved provide point-of-care analysis and diagnosis.

EXAMPLES

The following example is provided by way of illustration and is in no way intended to limit the scope of the present disclosure.

Example 1

This disclosed device combines the processes of dehydration and embedding for the creation of a tissue block for histological examination in a single device. The disclosed device takes advantage of short time of solvent diffusion due to the tissue diameter of the small biopsies and the exfoliated nature of cytology specimens for rapid fixation and combines the embedding step immediately after fixation to create a single-use device for production of rapid, on-demand histology blocks.

Placenta was used a model tissue, because placenta samples are readily available in clinical pathology labs and are often problematic due to under-fixation from thick grossing.

First, small fragments of placenta were cut to no more than 1.0 cm in greatest dimension. Multiple (but no more than 3 fragments) were loaded into the device. The plunger was disposed in the barrel of the device to define a receptacle for the serial addition of solvents. A heating element (hollowed aluminum jacket and a heating coil) was placed in thermal communication with the device to heat and maintain the receptacle at a temperature of approximately 40° C. (or temperatures greater than 37° C. for melting paraffin). The following reagents were introduced to the receptacle in succession through the opening at the top of the device and each solvent was removed via a vacuum connected to the bottom of the plunger:

TABLE 1

Reagent Order and Conditions

| Solvent | Volume | Incubation Time | Temperature | Number of Times Carried Out |
|---|---|---|---|---|
| 10% buffered formalin | 3 ml | 3 min. | 40° C. | 1 |
| Ethanol (70%) | 3 ml | 5 min. | 40° C. | 2 |
| Ethanol (90%) | 3 ml | 5 min. | 40° C. | 2 |
| Xylene | 3 ml | 5 min. | 40° C. | 3 |
| Melted paraffin | 3 ml | 20 min. | 40° C. | 1 |

The final step of the method involves holding the melted paraffin in the receptacle for about 20 minutes, but the paraffin is not removed by the vacuum. The device is designed so that the plunger is articulated upward, such that the filter is aligned to sit in plane with the compartment defining the mold at the second end of the barrel. A tissue embedding cassette is fitted on top of the compartment. Additional melted paraffin is added as needed to adhere the cassette to the top surface of the paraffin block. The mold is then cooled to solidify the paraffin and attach the block to the cassette for use in sectioning the specimen. The cooling temperature can range from about −10° C. to about 20° C.

The placenta tissue block molds were sectioned, placed on slides, and stained with hematoxylin and eosin according to standard procedures known in the art. Slides were compared to placenta samples fixed and embedded according to conventional tissue block preparation methods, in order to assess whether samples processed according to the disclosed rapid method maintain comparable morphology and antigenicity.

Figure 4A:
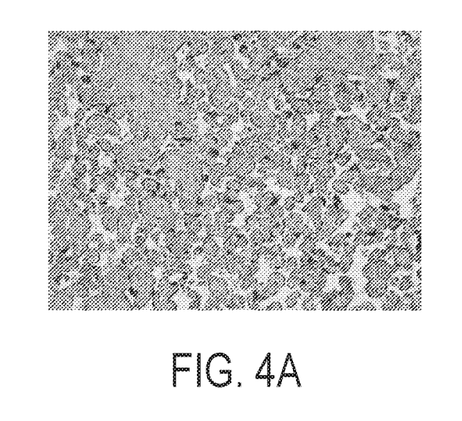
FIG. 4A is an image of a placenta biopsy prepared as a cell block according to conventional procedures, stained with hematoxylin and eosin (H&E), and viewed under 100× magnification.
Figure 4B:
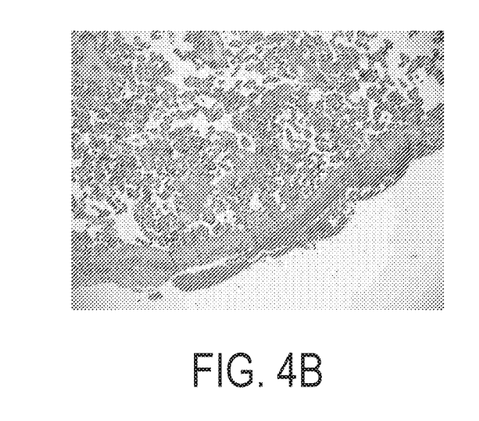
FIG. 4B is an image of a placenta biopsy prepared as a cell block according to a rapid method disclosed herein, stained with H&E, and viewed under 20× magnification.
Figure 4C:
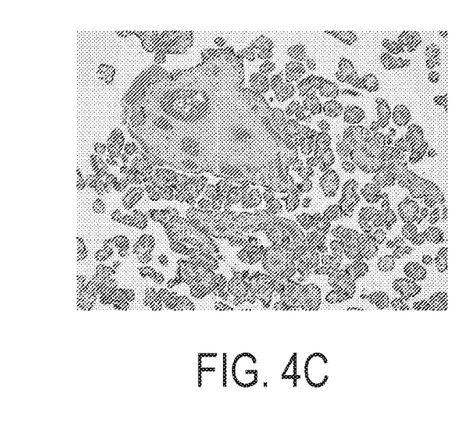
FIG. 4C is an image of a placenta biopsy prepared as a cell block according to a rapid method as disclosed herein, stained with H&E, and viewed under 100× magnification.

As shown in FIGS. 4A-4C, placenta samples processed to form tissue blocks according to the presently disclosed rapid methods (FIGS. 4B, 4C) achieved comparable antigenicity and morphology with respect to placental samples processed according to conventional methods (FIG. 4A). Thus, the instantly disclosed rapid methods permit more rapid generation of cell and tissue blocks for analysis, without compromising quality with respect to antigenicity or morphology of the test specimen.

All documents cited are incorporated herein by reference; the citation of any document is not to be construed as an admission that it is prior art with respect to the present invention.

It is to be further understood that where descriptions of various embodiments use the term "comprising," and/or "including" those skilled in the art would understand that in some specific instances, an embodiment can be alternatively described using language "consisting essentially of" or "consisting of."

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

The invention claimed is:

1. A device for rapid fixation and embedding of a biological specimen in an embedding matrix, the device comprising:
   a barrel comprising a first end and a second end, the first end of the barrel receiving a plunger, and the second end of the barrel opening to a compartment defining a block mold; and
   a plunger for inserting into the barrel, the plunger comprising a first end, a second end, and an interior conduit connecting the first end and the second end, wherein:
      the first end of the plunger connects to a vacuum source; and
      the second end of the plunger comprises a filter, the filter providing a semi-permeable barrier between the interior conduit of the plunger and a receptacle for receiving, fixing, and embedding the biological specimen in the embedding matrix, said receptacle defined inside the barrel when the plunger is disposed in the barrel.

2. The device of claim 1, wherein the biological specimen is a tissue biopsy or a cellular specimen obtained from a patient.

3. The device of claim 1, wherein the filter is a membrane that permits flow of solvents from the receptacle to the interior conduit of the plunger.

4. The device of claim 1, wherein the filter is comprised of a material selected from the group consisting of polycarbonate, cellulose nitrate, cellulose acetate, polyethersulfone, polytetra-fluoroethylene, polyamide, porous silicone, porous rubber, and combinations thereof.

5. The device of claim 1, wherein the block mold comprises a cell block mold or a tissue block mold for embedding the biological specimen in the embedding matrix.

6. The device of claim 5, wherein the embedding matrix is selected from the group consisting of paraffin wax, carbowax, acrylic resin, epoxy resin, agar, gelatin, and combinations thereof.

7. A system for rapid fixation and embedding of a biological specimen in an embedding matrix, the system comprising:
   a vacuum source;
   a device comprising:
      a barrel comprising a first end and a second end, the first end of the barrel receiving a plunger, and the second end of the barrel opening to a compartment defining a block mold;
      a plunger for inserting into the barrel, the plunger comprising a first end, a second end, and an interior conduit connecting the first end and the second end, wherein:
         the first end of the plunger is operably connected to the vacuum source; and
         the second end of the plunger comprises a filter, the filter providing a semi-permeable barrier between the interior conduit of the plunger and a receptacle for receiving, fixing, and embedding the biological specimen in the embedding matrix, said receptacle defined inside the barrel when the plunger is inserted in the barrel; and
   a heat source in thermal communication with the receptacle.

8. The system of claim 7, wherein the biological specimen is a tissue biopsy or cellular specimen obtained from a patient.

9. The system of claim 7, wherein the filter is a membrane that permits flow of solvents from the receptacle to the interior conduit of the plunger.

10. The system of claim 7, wherein the filter is comprised of a material selected from the group consisting of polycarbonate, cellulose nitrate, cellulose acetate, polyethersulfone, polytetra-fluoroethylene, polyamide, porous silicone, porous rubber, and combinations thereof.

11. The system of claim 7, wherein the block mold is a tissue block mold for embedding the biological specimen in the embedding matrix.

12. The system of claim 11, wherein the embedding matrix is selected from the group consisting of paraffin wax, carbowax, acrylic resin, epoxy resin, agar, gelatin, and combinations thereof.

13. The system of claim 7, wherein the heat source is selected from the group consisting of a heating element, a heat sink, a microwave producing magnetron, and combinations thereof.

14. The system of claim 7, further comprising a cooling source in thermal communication with the compartment defining the block mold.

15. The system of claim 14, wherein the cooling source is a recirculating cooler.

16. The system of claim 14, further comprising an insulating layer disposed between the heat source and the cooling source.

* * * * *